Jan. 5, 1932.                C. A. DE GIERS                1,839,300
                          LIQUID LEVEL INDICATOR
                   Filed Sept. 14, 1921    2 Sheets-Sheet 1

Inventor
Clarence A. de Giers
By his Attorneys

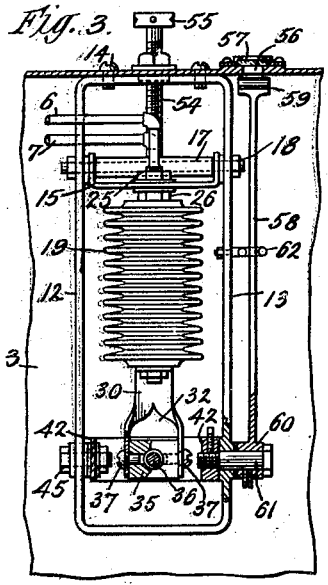

Patented Jan. 5, 1932

1,839,300

UNITED STATES PATENT OFFICE

CLARENCE A. DE GIERS, OF NEW YORK, N. Y., ASSIGNOR, BY MESNE ASSIGNMENTS, TO THE LIQUIDOMETER CORPORATION, OF WILMINGTON, DELAWARE, A CORPORATION OF DELAWARE

LIQUID LEVEL INDICATOR

Application filed September 14, 1921. Serial No. 500,585.

This invention relates to certain improvements in liquid level indicators or gauges.

In a co-pending application, Ser. No. 447,640, I have described and claimed broadly a mechanism for accurately indicating the quantity of a liquid in a tank or a similar receptacle, the liquid quantity being indicated on a gauge or indicator located at any desired point, the mechanism of the indicator being operated by the level of the liquid in the tank or other like receptacle. In the structure disclosed in said application the mechanism was unnecessarily complicated, and in addition there was a mechanism separate from the expansion chambers for counteracting the expansion or contraction of the parts of the apparatus due to temperature changes.

It is the especial object of the present invention to simplify and reduce the number of parts of the construction disclosed in my aforesaid application, and to produce a compact structure in which the liquid content of a tank or the like may be accurately determined under all conditions. It is a further object of the present invention to do away with the separate mechanism and to take care of the expansion or contraction of the indicating fluids in the expansion chambers themselves, thereby greatly simplifying the structure. It is a further object of the invention to provide simple and effective adjusting mechanism for changing the readings of the indicating liquid in the gauges as desired.

With these and other objects not specifically referred to in view, the invention consists in certain novel parts, arrangements and combination, a preferred form of which is shown in the accompanying drawings, in connection with which the invention will be described in detail and the novel features pointed out in the claims annexed hereto.

In the drawings,—

Fig. 1 is a diagrammatic side elevation of an arrangement that may be employed where it is desired to indicate at a common point the liquid level in two tanks or receptacles, such as the gasoline and oil tanks of an automobile, motor boat, aeroplane, or the like;

Fig. 3 is a sectional end view, the section being taken on line 3—3 of Fig. 4;

Fig. 4 is a central sectional view on a somewhat enlarged scale of the operating mechanism shown in Fig. 2;

Fig. 5 is a detail top view of the expansion chambers shown in Fig. 4, partly in section, the section being taken on line 5—5 of Fig. 4; and Fig. 6 is a top sectional view showing certain adjusting connections, the section being taken on line 6—6 of Fig. 4.

Figure 1:
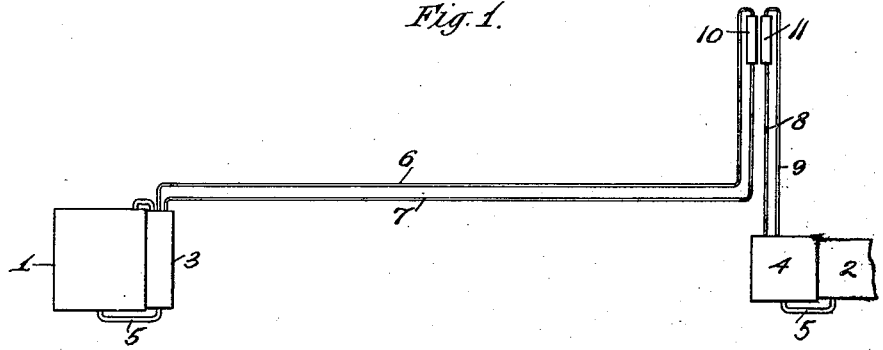

Referring now to these drawings, the invention has been illustrated as employed for indicating at a common point the liquid level of two tanks such as used in automobiles, motor boats, aeroplanes, and the like, employing separate tanks for gasoline and oil, but it will be understood, of course, that the invention is adapted for use and may be used in various other relations. These tanks are indicated by the numerals 1 and 2. The indicating mechanism hereinafter referred to may be placed either in these tanks or in similar tanks 3, 4 secured to the tanks 1, 2 and in communication therewith by means of by-passes 5, this construction being adopted where the device is installed in an automobile or the like already provided with a tank. It will be understood, however, that the mechanism may be placed directly in the main tank if desired. From these tanks leads a system of pipes 6, 7, 8 and 9, a pair of these pipes leading from each tank to visual indicators or gauges 10, 11 in the form of tubes mounted in a box or casing 11' which are preferably, as shown, located close together, and conveniently placed, as, for instance, on the dash board of an automobile. The face of the box or casing beside the tubes may be provided with any suitable indicating scale for measuring in gallons or quarts or other desired liquid units.

In accordance with the invention there is provided an operating mechanism actuated by the level of the liquid in the tank, and as these operating mechanisms are the same for all tanks, but one of them will be described. Each operating mechanism is located in the tank and will include a closed circuit comprising a pair of expansion and compression chambers and piping leading to each end of the indicator or gauge, each side of the circuit being filled with a different colored liquid, and it is in the construction and arrangement of the expansion and compression chambers that one of the important features of the present invention resides, so that a compact and simple operating mechanism may be provided for operating the indicator. In the construction illustrated there is provided a bracket having spaced arms 12, 13 suspended from the top of the tank, being secured thereto by screws 14 or in any other suitable manner, this bracket forming a support for the parts hereinafter referred to. Mounted near the upper end of this bracket is an open frame 15 provided with cross webs 16, this frame being pivoted on a rod 17 secured in the arms 12, 13 of the bracket and held in position by means of nuts 18.

This frame work 15 acts as a support for a pair of chambers 19, 20 which are, as shown, arranged side by side and close together. These chambers are made of resilient metal such as thin copper which will contract and expand longitudinally but which will not appreciably change in diameter, the walls of these chambers being bent or corrugated, as indicated at 21, to form in effect a bellows which contracts and expands longitudinally and bends readily sidewise.

These chambers resisting radial pressure may be used in the pressure tanks now commonly used for feeding out gasoline in automobiles and the like, this feeding pressure not affecting the operation of the chambers. These compression chambers are supported from the frame work in any suitable manner, and are connected at their upper ends with pipes 6, 7 before referred to, leading to opposite sides of the gauge 10. While these connections may be of various characters, in the particular construction illustrated, each of the chambers will have securely fixed thereto a threaded plate 22 into which screws a short section of pipe 23, the end of this pipe opening into the chambers through an opening 24 formed in the top wall thereof. These short pipe sections 23 are united with the pipes 6, 7 by suitable couplings 24ª, and the parts are held in position by means of lock nuts 25, 26 screwed around the pipes 23 and against the surfaces of the webs 16 of the frame 15. In the best constructions and for a purpose hereinafter referred to these webs are slotted as indicated at 27 in Fig. 5, so that by loosening the lock nuts the pipes and through them the chambers may be given slight sidewise movements.

The lower ends of each of the compression chambers have affixed thereto a plate 28 provided with a threaded projection 29 about which takes the split end of a strip of spring metal 30, the end of the strip being turned as shown so as to lie flat against the plate and being securely held in position by a nut 31. The other end of this spring strip is forked as indicated at 32 in Fig. 3, the forked sides bearing against adjusting nuts 35 carried on a short rod 36, the sides of the spring strips being secured to the nuts by screws 37 so as to have a swinging or pivotal movement on the stems of these screws as hereinafter referred to.

Figure 2:
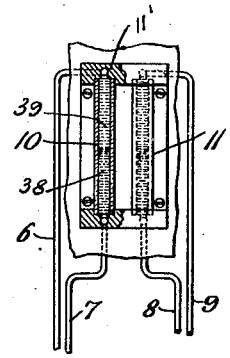
Fig. 2 is a side view of one of the tanks shown in Fig. 1, showing the operating mechanism for the visual indicators or gauges, the tank being shown in section and certain of the parts being broken away.
Figure 2:
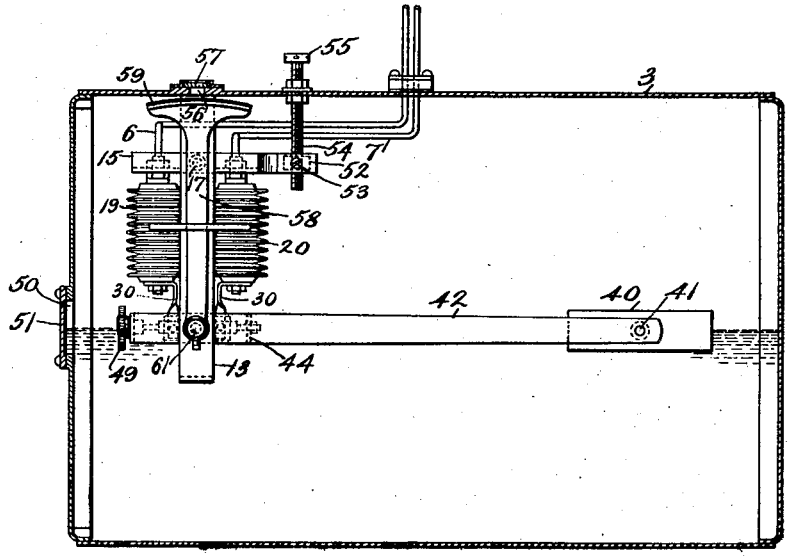

The connections from the chambers to the indicator are liquid-tight, the two chambers, the pipes and the indicator forming in effect a closed circuit so that as one chamber is compressed the other chamber is expanded, and vice versa. One of these chambers, as chamber 19, is filled with a colored liquid, as a colored water solution, and the other chamber 2 is filled with a liquid of another color and one which will not mix with the colored water, as, for instance, an oil solution, these colors being indicated by the shading shown in Fig. 2, the colored water being indicated by the heavy shading 38, and the oil by the light shading 39. These solutions fill the system and are conducted by the pipes 6, 7 to the opposite ends of the indicator or gauge proper 10, the oil solution being shown as above the water solution. The liquids must have substantially the same co-efficients of expansion.

The expansion and contraction of the chambers, to indicate at the gauge the quantity of the liquid in the tank, are effected by suitable means operated by the rise and fall of the liquid in the tank, and in the particular construction illustrated, this is effected by means of a float 40 of any suitable character and which floats on the liquid contained in the tank. In the particular construction illustrated this float is a flat hollow metal body and is pivoted at each side at 41 to a pair of arms 42, which are connected at their ends by a cross brace 43 and between their ends by an intermediate brace 44. These arms are pivoted near their outer ends in the side arms 12, 13 of the bracket before referred to by nuts 45 so as to swing in the arms. In the best constructions means are provided whereby the connections between the float and the compression chambers may be adjusted so that the movement of the float will cause more or less compression in the chambers, as may be desired. While these means may be varied, in the particular construction illustrated, the rod 36 and adjusting nuts 35 before referred to are utilized for this purpose. In order to effect this the cross rod 36 is mounted in the cross braces 43, 44 of the arms 42 before referred to, being held in position by nut 46. This rod is provided with a pair of enlargements 47 on which are formed right and left hand threads 48, and the rod at its outer end is provided with a nut 49 by which it may be turned. By turning this rod the nuts cause the spring members 30 to which are secured the compression chambers to move toward or from the end of the arm 42 and thus vary their position relatively to the float, so that the movement of the float will cause more or less compression movement of the chambers, depending on the position of the nut. A hand hole 50 covered by a removable plate 51 is provided for convenient access to the adjusting screw 49. The flexible walls of the chambers 19 and 20 will give or flex sufficiently to permit this adjusting movement, and the pipes 6, 7 and couplings are made of flexible metal tubing so as to permit this sidewise movement of the chambers, copper tubing being preferably used.

The compression chambers are fixed at their upper ends, but are pivotally attached to the float lever as above described. When the float moves about its fulcrum one chamber is placed under tension and the other under compression. The chamber under tension elongates thereby increasing its volume. Due to the arcuate path of pivot 37 and the rigidity of the support of the upper end of the chamber, it is necessary for the chamber, or strip 30, or both of them to flex slightly sidewise. The chamber under compression contracts lengthwise and decreases its volume. At the same time, due to the rigid mounting of the upper end of the chamber and to the fact that pivot 37 is located to one side of the vertical axis of the chamber, the chamber under compression bows slightly sidewise. When the chambers are mounted as shown in the present drawings it is readily apparent that the chamber under compression will bow away from the other cylinder. In order for the bowing to take place it is necessary for the chamber, or strip 30, or both of them, to flex sidewise. If a change of temperature occurs whereby both chambers are placed under tension or both under compression they will both deform simultaneously in like manner so that neither the float nor the indicator are moved. Briefly, the indication changes only when one chamber is extended and the other contracted by action of the float.

If desired an adjustment may be given the compression chambers 19, 20 to compress one of them and expand the other so as to cause one or the other of the liquids to rise or fall to any desired level in the gauge, and an adjustment for this purpose is disclosed in the drawings. As shown, referring to Fig. 4, the end of the frame 15 is provided with a block 52 secured between the frame members by screws 53, and into this block is threaded a stem 54 which passes through the top of the tank and is provided at one end with a head 55 by which it can be turned. By rotating this adjustment screw 54, frame 15 may be rocked about its pivot 17. This movement contracts one chamber and expands the other so as to cause a variance in the level of the liquid in the gauge, as previously explained. To vary this movement more widely the position of the chambers relatively to the fulcrum point 17 of the frame may be adjusted by loosening the lock nuts 25 before referred to and sliding the pipes 23 and with them the chambers in the slots 27 as above described.

In many instances it is desirable that a visual indicator be provided at the tank, particularly in instances where the device is used in an automobile and the tank is at a part of the car distant from the gauge, and such an indicator is provided by the present invention which will be effective and accurate in operation under all circumstances, this indicator being operated by the float. While these indicators may be of various characters, in the particular construction illustrated the tank is formed with an aperture 56 provided with a glass cover 57. Beneath this cover is arranged to swing an arm 58 provided with a sector 59 on the top of which indicia indicating the quantity of liquid in the tank may be placed, this sector swinging past the opening 56. This arm is mounted at its lower end on one of the float arms 42 and to effect this the arm is provided with a hub 60 pinned to a stud 61 which, in turn, is pinned to one of the arms 42 before referred to, so that as the float rises and falls, the arm will be swung to move the indicia on the sector so that it can be shown. In the best constructions a guide 62 is provided for this arm, this guide being secured to one of the arms as 13 of the bracket before referred to.

The operation of the device will be clear from the above description. As the level in the tank rises or falls one of the chambers 19, 20 is compressed and the other expanded and vice versa. This causes the liquid to flow into one chamber and out of the other thereby causing an up or down movement of the meeting line of the liquids in the gauge past the indicating marks thereon, and thus indicate the liquid in the tank. Furthermore, the construction described takes care of expansion and contraction of the liquid in the systems in the compression chambers, the chambers swinging on the pivots formed by strips 30 and screws 37 as they expand or contract by the expansion or contraction of the liquid due to temperature changes, as previously described.

What is claimed is:
1. The combination of a tank, a float therein and adapted to rise and fall with the liquid in the tank, a pair of liquid holding expansion and contraction chambers, a pivotally mounted float arm, means to connect said chambers to said arm on opposite sides of its pivot so that as the float rises one chamber is expanded and the other compressed and vice versa as the float falls, a pressure responsive indicator, a liquid holding pipe leading from each of the chambers to opposite ends of the indicator, through which the liquid displaced by the movement of the chambers passes and causes the indicator to indicate the liquid content of the tank, and means to support said chambers so that they can be given a movement independent of the movement given them by the action of the float and thus permit expansion or contraction of the liquid due to temperature changes without causing variations at the indicator.

2. The combination of a tank, a float therein and adapted to rise and fall with the liquid in the tank, a pair of liquid holding expansion and contraction chambers, a pivotally mounted float arm, means to connect said chambers to said arm on opposite sides of its pivot so that as the float rises one chamber is expanded and the other compressed and vice versa as the float falls, a pressure responsive indicator, a liquid holding pipe leading from each of the chambers to opposite ends of the indicator, through which the liquid displaced by the movement of the chambers passes and causes the indicator to indicate the liquid content of the tank, said connecting means including devices whereby the chambers are adapted to have a movement independent of the movement given them by the action of the float and thus permit expansion or contraction of the liquid due to temperature changes without causing variations at the indicator.

3. The combination of a tank, a float therein and adapted to rise and fall with the liquid in the tank, a pair of liquid holding expansion and contraction chambers, a pivotally mounted float arm, means to connect said chambers to said float arm on opposite sides of its pivot so that as the float rises one chamber is expanded and the other compressed and vice versa as the float falls, a pressure responsive indicator, a liquid holding pipe leading from each of the chambers to opposite ends of the indicator, through which the liquid, displaced by the movement of the chambers, passes and causes the indicator to indicate the liquid content of the tank, means to mount said chambers so that they may be permitted to have movement relative to and independent of the float on the expansion or contraction of the liquid due to temperature changes, and means for varying the limits of the contracting and expanding movement of the chambers.

4. The combination of a tank, a float mounted therein to rise and fall with liquid in the tank, a pressure responsive indicator, a pair of liquid holding expansion and contraction chambers, a pivotally mounted float arm, means to connect said chambers to said float arm on opposite sides of its pivot, liquid holding pipes leading from the chambers to opposite ends of the indicator, a bracket for supporting the chambers and the float arm, a frame secured to the bracket to which the chambers are secured at one end, said connecting means being adapted to permit a relative movement of said chambers towards or away from each other.

5. The combination of a tank, a float mounted therein to rise and fall with liquid in the tank, a pressure responsive indicator, a pair of liquid holding expansion and contraction chambers, a pivotally mounted float arm, means to connect said chambers to said float arm on opposite sides of its pivot, liquid holding connections from the chambers to opposite ends of the indicator, a bracket for supporting the chambers and the float arm, a frame secured to the bracket to which the chambers are secured at one end, and means for adjusting the frame to vary the expanding and contracting movement of the chambers.

6. The combination of a tank, a float pivoted therein, a pressure responsive indicator, a pair of liquid holding compression and expansion chambers, a pivotally mounted float arm, means to connect said chambers to said float arm on opposite sides of its pivot, liquid holding connections from the chambers to opposite ends of the indicator, a pivoted frame, means to secure the chambers thereto at one end, means for adjusting the frame on its pivot, said connecting means including devices for connecting the unattached ends of the chambers and the float arm to permit independent movement between said chambers.

7. The combination of a tank, a float, means to mount said float in said tank including a pivotally mounted float arm for the float adapted to be rocked about its fulcrum as the float moves with the liquid in the tank, a pair of expansion and contraction chambers, means to connect said chambers to the float arm on opposite sides of its fulcrum, a pressure responsive indicator, liquid holding connections from the chambers to opposite ends of the indicator, said connector means being arranged to pivotally connect the chambers and the float arm to permit a movement of the chambers independent of the float on the contraction or expansion of the liquid due to temperature changes.

8. The combination of a tank, a float, a float arm, means to pivotally mount said float arm in the tank, a pair of fluid-filled expansion and contraction chambers, means to mount said chambers pivotally side by side on opposite sides of the pivot point of the float arm, a pressure responsive indicator, pipes from the chambers to opposite ends of the indicator, said mounting means being independent of the pipes and adapted to permit movement of the chambers independently of the movement given them by the action of the float arm, and thus permit expansion or contraction of the fluid due to temperature changes without causing variation at the indicator.

9. The combination of a tank, a bracket suspended therein, a float having an arm pivotally mounted in the bracket, a pressure responsive indicator, a frame pivoted in the bracket, means for adjusting the frame, a pair of expansion and contraction chambers mounted in the frame side by side and having pivotal connections with the float arm on opposite sides of its pivot, and pipe connections from the chambers to opposite ends of the indicator.

10. The combination of a tank, a bracket suspended therein, a float, a float arm, means to pivotally mount said float arm in the bracket, a pressure responsive indicator, a frame supported in the bracket, a pair of expansion and contraction chambers, means to mount said chambers in the frame side by side, means comprising spring strips for connecting said chambers to opposite sides of the pivot of the float arm, and pipe connections from the chambers to opposite ends of the indicator.

In testimony whereof, I have hereunto set my hand.

CLARENCE A. DE GIERS.